May 10, 1960 W. NAEGELI 2,935,767
DRAWING ROLLER AGGREGATE FOR TEXTILE MACHINES
Filed Nov. 19, 1956
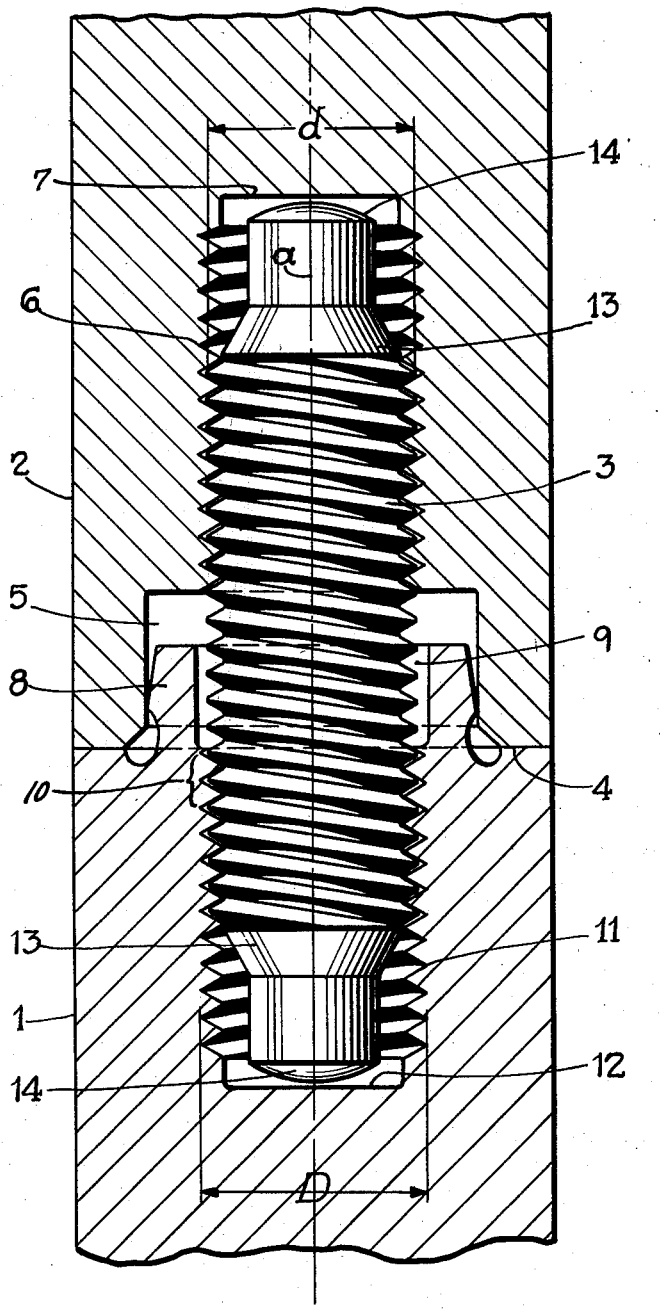
INVENTOR.
WERNER NAEGELI.
BY
K. H. Mayr.
ATTORNEY.

United States Patent Office 2,935,767
Patented May 10, 1960

2,935,767

DRAWING ROLLER AGGREGATE FOR TEXTILE MACHINES

Werner Naegeli, Winterthur, Switzerland, assignor to Joh. Jacob Rieter & Co. Ltd., Winterthur, Switzerland, a corporation of Switzerland Application November 19, 1956, Serial No. 623,240

4 Claims. (Cl. 19—141)

The present invention relates to a drawing roller aggregate, more particularly to a coupling for the drawing rollers of textile machines.

Such rollers are generally fluted cylinders. The requirements for the true running of the drawing rollers of drafting mechanisms of textile machines have reached such a degree that the results obtained with the couplings hitherto employed are no longer adequate.

According to the present invention, there is provided a drawing roller coupling in which the rollers to be coupled have at their ends centering means which have an exclusively radial action and in which the end faces of the rollers perpendicular to the common axis thereof are pressed together by an independent screw-threaded bolt having no guiding action.

An advantage of the construction provided by the invention resides in an extremely simple design, which at the same time substantially meets all the increased requirements placed on couplings of drawing rollers.

The single figure of the accompanying drawing is a cross-section through a drawing roller coupling according to the invention. The drawing illustrates the end portions of two drawing rollers 1 and 2, which are connected by a screw-threaded bolt 3 and have plane end faces 4 which are perpendicular to the common axis $a$ of the rollers. The roller 2 has a cylindrical centering bore 5 whose interior surface is preferably hardened and from which a threaded bore 6 extends axially and terminates in an end face 7 which is parallel to the end faces 4. The adjacent roller 1 has, for guidance in the centering bore 5, a tapered centering extension or protuberance 8, the surface of which is preferably hardened.

An unthreaded, i.e., plane, recess 9 is formed in the centering extension 8 and extends into the plane containing the end faces 4 so that the most heavily loaded threaded portion 10 of a threaded axial bore 11 in the roller 1, which bore has a plane end face 12, can be located in that part of the roller 1 which, by reason of its greater wall thickness, cannot be affected by a slight deformation of the first supporting turns of the portion 10 of the thread, which turns are most heavily loaded. Consequently disturbance of the centering action produced by the cooperation of the centering bore 5 and of the centering protuberance 8 is impossible.

The screw-threaded bolt 3 has at each end a short cylindrical portion terminated by a convex meniscus-shaped portion 14 and adjoining a frustum 13 of a cone. In the event the bolt 3 is screwed in too far and abuts against the end faces 7 and 12 of the threaded bores 6 and 11, the convex meniscus-shaped portion 14 prevents sliding of the bolt on the end faces which would disturb the alignment of the rollers. To additionally ensure that the bolt cannot perform any guiding function, i.e., to prevent any disadvantageous effect on the centering by the bolt, the threaded diameter $d$ of the threaded bolt 3 is made smaller by about 2% to 3% than the outer diameter $D$ of the threaded bore. The same result can be achieved by choosing an appropriate diameter ratio $$\frac{D}{d}$$

which guarantees a non-guiding, exclusively axial action of the bolt on the drawing rollers.

What is claimed is:

1. A drawing roller aggregate for textile machines comprising a pair of rollers, each roller having an end portion, said end portions having opposed faces extending radially of the rotation axes of said rollers and abutting against each other for positioning the rotation axes of said rollers in parallel relation, guide means forming part of said rollers and producing an exclusively radial action for aligning the rotation axes of said rollers, said end portions having threaded axial bores, and a threaded bolt screwed into said bores, a radial clearance being provided between the entire threading of said bolt and the entire threading of said bores for producing an exclusively axially acting holding force between said rollers and said bolt, upon tightening of said rollers onto said bolt.

2. A drawing roller aggregate as defined in claim 1 wherein said guide means includes a tapered protuberance forming a coaxial extension of one of said end portions, and a substantially cylindrical recess in and coaxial of the other end portion, said protuberance being received in and radially abutted by said recess.

3. A drawing roller aggregate according to claim 2 in which the bore in the end portion of the roller provided with said protuberance extends through said protuberance, and in which the portion of said last mentioned bore which extends through said protuberance is plane.

4. A drawing roller aggregate according to claim 1 in which the bottoms of said bores are plane and the ends of said bolt individually facing said bottoms have the configuration of a convex meniscus.

References Cited in the file of this patent

UNITED STATES PATENTS

| | | |
|---|---|---|
| 2,456,764 | Bach et al. | Dec. 21, 1948 |
| 2,584,640 | Taylor | Feb. 5, 1952 |

FOREIGN PATENTS

| | | |
|---|---|---|
| 293,058 | Great Britain | July 2, 1928 |